(12) United States Patent
Moon et al.

(10) Patent No.: US 12,524,846 B2
(45) Date of Patent: Jan. 13, 2026

(54) APPARATUS AND METHOD FOR IMPROVING NO-FLASH IMAGE QUALITY USING FLASH IMAGE

(71) Applicant: GWANGJU INSTITUTE OF SCIENCE AND TECHNOLOGY, Gwangju (KR)

(72) Inventors: Bochang Moon, Gwangju (KR); Geunwoo Oh, Gwangju (KR); Jonghee Back, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 292 days.

(21) Appl. No.: 18/376,902

(22) Filed: Oct. 5, 2023

(65) Prior Publication Data

US 2024/0144444 A1 May 2, 2024

(30) Foreign Application Priority Data

Oct. 26, 2022 (KR) .................. 10-2022-0139315

(51) Int. Cl.
*G06T 5/70* (2024.01)
*G06T 5/50* (2006.01)
*G06T 7/90* (2017.01)

(52) U.S. Cl.
CPC .................. *G06T 5/70* (2024.01); *G06T 5/50* (2013.01); *G06T 7/90* (2017.01); *G06T 2207/20084* (2013.01); *G06T 2207/20221* (2013.01)

(58) Field of Classification Search
CPC ......... G06T 5/70; G06T 5/90–94; G06T 5/50; G06T 7/90; G06T 2207/20084; G06T 2207/20221
See application file for complete search history.

(56) References Cited

U.S. PATENT DOCUMENTS 7,738,015 B2 * 6/2010 Steinberg ............. H04N 1/6086
382/117
2017/0180691 A1 * 6/2017 Sunkavalli ................ G06T 7/00
(Continued)

OTHER PUBLICATIONS

Back et al., "Deep Combiner for Independent and Correlated Pixel Estimates," ACM Trans. Graph., Dec. 2020, vol. 39, No. 6, article 242 (12 pages); Cited in the Specification.
(Continued)

*Primary Examiner* — Sean T Motsinger
(74) *Attorney, Agent, or Firm* — Hauptman Ham, LLP (57) ABSTRACT

The present disclosure relates to an apparatus and method for improving no-flash image quality by removing noise included in a no-flash image using a flash image. An apparatus for improving no-flash image quality using a flash image according to an example embodiment of the present disclosure includes an artificial neural network module which is trained by receiving an image pair of a flash image and a no-flash image and configured to output a convolutional kernel $k_c$ and a composite weight $w_{ci}$ from a local flash image patch and a no-flash image patch, a convolution unit configured to convolve the flash image patch and the convolutional kernel to generate a consistent flash image patch, and a combining module configured to combine the no-flash image patch and the consistent flash image patch using the composite weight $w_{ci}$ to produce a denoised image.

12 Claims, 5 Drawing Sheets

(56) References Cited

U.S. PATENT DOCUMENTS

| | | | |
|---|---|---|---|
| 2017/0180692 A1* | 6/2017 | Sunkavalli | H04N 23/56 |
| 2020/0068151 A1* | 2/2020 | Pourreza Shahri | H04N 9/646 |
| 2020/0236270 A1* | 7/2020 | Pourreza Shahri | H04N 23/74 |
| 2020/0267299 A1* | 8/2020 | Le | H04N 23/741 |
| 2022/0156902 A1* | 5/2022 | Moon | G06T 5/50 |
| 2024/0144444 A1* | 5/2024 | Moon | G06T 7/90 |
| 2025/0080856 A1* | 3/2025 | Gao | G06T 1/0007 |

OTHER PUBLICATIONS

Li et al., "Deep Joint Image Filtering," European Conference Computer Vision (ECCV), 2016, LNCS 9908, pp. 154-169; Cited in the Specification.

Xia et al., "Deep Denoising of Flash and No-Flash Pairs for Photography in Low-Light Environments," IEEE/CVF Conference Computer Vision and Pattern Recognition, 2021, pp. 2063-2072; Cited in the Specification.

Deng et al., "Deep Convolutional Neural Network for Multi-Modal Image Restoration and Fusion," IEEE Transactions on Pattern Analysis and Machine Intelligence, Oct. 2021, vol. 43, No. 10, pp. 3333-3348; Cited in the Specification.

Dabov et al., "Image Denoising by Sparse 3-D Transform-Domain Collaborative Filtering," IEEE Transactions on Image Processing, Aug. 2007, vol. 16, No. 8, pp. 2080-2095; Cited in the Specification.

Zhang et al., "FFDNet: Toward a Fast and Flexible Solution for CNN-Based Image Denoising," IEEE Transactions on Image Processing, Sep. 2018, vol. 27, No. 9, pp. 4608-4622; Cited in the Specification.

\* cited by examiner

(a) No-flash image  (b) Flash image  (c) BM3D  (d) FFDNet (e) DJF  (f) CU-Net  (g) DC  (h) Ours

APPARATUS AND METHOD FOR IMPROVING NO-FLASH IMAGE QUALITY USING FLASH IMAGE

CROSS-REFERENCE TO RELATED APPLICATION

This application claims the benefit of Korean Patent Application No. 10-2022-0139315 filed on Oct. 26, 2022, in the Korean Intellectual Property Office, the entire disclosure of which is incorporated herein by reference for all purposes.

BACKGROUND

1. Field of the Invention

The present disclosure relates to an apparatus and method for image quality improvement, and more particularly, to an apparatus and method for improving quality of a no-flash image by removing noise included in the no-flash image using a flash image.

2. Description of the Related Art

Figure 1:
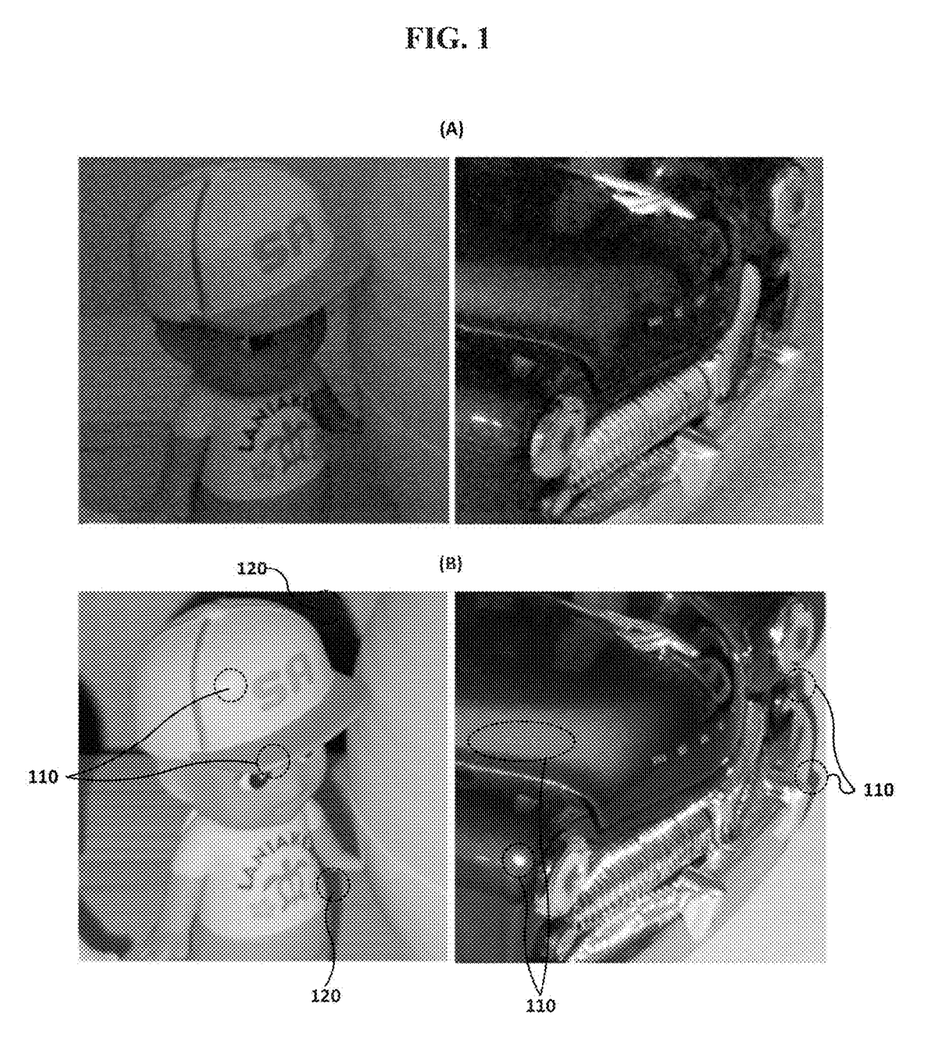
FIG. 1 is an example of a no-flash image and a flash image for the same object, where (A) is a no-flash image and (B) is a flash image.

An image shot under a low-light condition, in other words, an image shot without a camera flash (hereinafter, referred to as a no-flash image) includes distracting noise as shown in (A) of FIG. 1. Removing noise from this no-flash image to restore a clean image is an important computer vision issue.

On the other hand, an image (hereinafter, referred to as a flash image) shot by firing the camera flash includes high-frequency details in which noise is greatly reduced as shown in (B) of FIG. 1. Many studies have shown that a method of removing noise of a no-flash image using a flash image can restore a clear image compared to conventional methods of removing noise using only a no-flash image.

Deep neural network training to restore a ground truth image by removing noise from the no-flash image has received a lot of attention in recent years, and deep neural networks are widely used to fuse image pairs of flash images and no-flash images.

Back, J. et al. proposed a deep combiner that removes noise by combining an independent image with noise and an ideal correlation image without noise (Non-Patent Document 1). Li, Y. et al. constructed a convolutional neural network that uses a flash image to restore a no-flash image (Non-Patent Document 2). Xia, Z. et al. proposed a kernel prediction network to strongly combine flash/no-flash pixel colors while resolving misalignments between two input images (Non-Patent Document 3). In addition, Deng and Dragotti proposed a common and unique information splitting network (CU-Net) for fusing different source images, and showed excellent noise removal results using a pair of flash and no-flash images (Non-Patent Document 4).

On the other hand, the flash image may include specular highlights 110 and hard shadows 120 that are not present in the no-flash image, and an inconsistent flash image including specular highlights and hard shadows has a different image structure (e.g., edge) from the ground truth.

Since a deep neural network fusing rendered image pairs presented in Non-Patent Document 1 does not take into account the inconsistent specular highlights or hard shadows of the flash image, there is a limit to noise removal by such specular highlights or hard shadows, and there is an issue of generating artifacts (residual noise or ghosting).

PRIOR ART DOCUMENTS

Non-Patent Documents (Non-Patent Document 0001) Document 1: Back, J.; Hua, B.-S.; Hachisuka, T.; and Moon, B. 2020. Deep Combiner for Independent and Correlated Pixel Estimates. ACM Trans. Graph., 39(6).

(Non-Patent Document 0002) Document 2: Li et al, Y.; Huang, J.-B.; Narendra, A.; and Yang, M.-H. 2016. Deep Joint Image Filtering. In Eur. Conf. Comput. Vis., 154-169

(Non-Patent Document 0003) Document 3: Xia, Z.; Gharbi, M.; Perazzi, F.; Sunkavalli, K.; and Chakrabarti, A. 2021. Deep Denoising of Flash and No-Flash Pairs for Photography in Low-Light Environments. In IEEE Conf. Comput. Vis. Pattern Recog., 2063-2072.

(Non-Patent Document 0004) Document 4: Deng, X.; and Dragotti, P. L. 2021. Deep Convolutional Neural Network for Multi-Modal Image Restoration and Fusion. IEEE Trans. Pattern Anal. Mach. Intell., 43(10): 3333-3348.

(Non-Patent Document 0005) Document 5: Kostadin Dabov, V. K., Alessandro Foi; and Egiazarian, K. 2007. Image Denoising by Sparse 3-D Transform-Domain Collaborative Filtering. IEEE Trans. Image Process., 16(8): 2080-2095.

(Non-Patent Document 0006) Document 6: Zhang, K.; Zuo, W.; and Zhang, L. 2018. FFDNet: Toward a Fast and Flexible Solution for CNN-Based Image Denoising. IEEE Trans. Image Process., 27(9): 4608-4622.

SUMMARY

An object of the present disclosure is to provide an apparatus and method for improving image quality capable of removing noise from a no-flash image and estimating a ground truth image by learning an optimal fusion of a pair of flash and no-flash images.

The present disclosure may be implemented in a variety of ways, including an apparatus (system), a method, a computer program stored in a non-transitory computer-readable medium, or a non-transitory computer-readable medium in which a computer program is stored.

In accordance with an aspect of the present disclosure, there is provided an apparatus for improving no-flash image quality using a flash image including an artificial neural network module which is trained by receiving an image pair of a flash image and a no-flash image and configured to output a convolutional kernel $k_c$ and a composite weight $w_{ci}$, from a local flash image patch and a no-flash image patch, a convolution unit configured to convolve the flash image patch and the convolutional kernel to generate a consistent flash image patch, and a combining module configured to combine the no-flash image patch and the consistent flash image patch using the composite weight $w_{ci}$ to produce a denoised image.

Preferably, the flash image patch and the no-flash image patch are an aligned image pair.

Preferably, the combining module is configured to estimate a color value of pixel c of a ground truth image using an estimation function of Equation 4.

Preferably, the convolutional kernel $k_c$ per pixel is normalized.

Preferably, the artificial neural network module is trained by receiving the image pair of the flash image and the no-flash image with a trainable parameter θ so as to minimize loss.

More preferably, an optimal training parameter $\hat{\theta}$ of the artificial neural network module is defined by Equation 5.

In accordance with another aspect of the present disclosure, there is provided a method of improving no-flash image quality using a flash image including applying a local flash image patch and a no-flash image patch to an artificial neural network module trained by receiving an image pair of a flash image and a no-flash image to output a convolutional kernel $k_c$ and a composite weight $w_{ci}$, convolving the flash image patch and the convolutional kernel to generate a consistent flash image patch by a convolution unit, and combining the no-flash image patch and the consistent flash image patch using the composite weight $w_{ci}$ with an estimation function to produce a denoised image by a combining module.

Preferably, the flash image patch and the no-flash image patch are an aligned image pair.

Preferably, the estimation function is defined by Equation 4.

Preferably, the convolutional kernel $k_c$ per pixel is normalized.

Preferably, the artificial neural network module is trained by receiving the image pair of the flash image and the no-flash image with a trainable parameter θ so as to minimize loss.

More preferably, an optimal training parameter $\hat{\theta}$ of the artificial neural network module is defined by Equation 5.

According to example embodiments of the present disclosure, it is possible to learn an optimal fusion of a pair of a flash image and a no-flash image to remove noise from the no-flash image and minimize artifact generation.

According to example embodiments of the present disclosure, it is possible to estimate a ground truth image by inferring a consistent flash image patch from a flash image using a convolution kernel per-pixel and fusing the consistent flash image patch and a no-flash patch.

Effects of the present disclosure are not limited to the above-mentioned effects, and other effects not mentioned may be clearly understood from the description of the claims to a person skilled in the art to which the present disclosure pertains (hereinafter, referred to as "a person skilled in the art").

BRIEF DESCRIPTION OF THE DRAWINGS

Example embodiments of the present disclosure will be described with reference to the accompanying drawings described below, wherein similar reference numerals represent similar components, but are not limited thereto.

DETAILED DESCRIPTION

Hereinafter, example embodiments for implementation of the present disclosure will be described in detail with reference to the accompanying drawings. However, in the following description, if there is a risk of unnecessarily obscuring the gist of the present disclosure, a specific description of a well-known function or configuration will be omitted.

In the accompanying drawings, like reference numerals refer to like components. In addition, in the description of the following example embodiments, redundant description of the same or corresponding components may be omitted. However, even if the description of the component is omitted, it is not intended that such a component is not included in any embodiment.

Advantages and features of embodiments disclosed herein, and methods for achieving them, will be clarified with reference to the example embodiments described below with the accompanying drawings. However, the present disclosure is not limited to the example embodiments disclosed below, but may be implemented in various different forms, and the example embodiments are provided merely to fully inform a person skilled in the art of the scope of the invention related to the present disclosure.

Unless otherwise defined, all terms (including technical and scientific terms) used herein may be used as the same meanings as those generally understood by a person skilled in the art to which the present disclosure pertains. In addition, terms defined in dictionaries generally used are not to be construed as an ideal or excessively formal meaning unless otherwise defined herein.

For example, the term "technology" may refer to a system, method, computer-readable instruction, module, algorithm, hardware logic, and/or operation permitted by the context described above throughout the specification.

Terms used herein will be briefly described, and disclosed example embodiments will be described in detail. The terms used herein have been selected from general terms that are currently widely used as much as possible while considering the functions in the present disclosure, but they may vary according to the intention of a person skilled in the art, a precedent, or emergence of new technologies. In addition, in certain cases, some terms are arbitrarily selected by the applicant, and in this case, their meanings will be described in detail in the description of the invention. Therefore, the term used in the present disclosure should be defined based on the meaning of the term and the overall content of the present disclosure, not just the name of the term.

In the specification, singular expressions are intended to include plural expressions, unless the context clearly indicates otherwise. In addition, plural expressions include singular expressions, unless the context clearly indicates otherwise. When it is described that a part comprises a component in the entire specification, this means that the part may further include other components without excluding other components, unless specifically stated to the contrary.

In the present disclosure, the terms such as "comprise" and/or "comprising" specify the presence of stated features, steps, operations, elements and/or components, but do not preclude the addition of one or more other features, steps, operations, elements, components, and/or combinations thereof.

In the present disclosure, when it is mentioned that one component is "coupled", "combined", "connected" or "associated" with or "reacts" to another component, the component may be directly coupled, combined, connected or associated with and/or react to the other component, but is not limited thereto. For example, there may be one or more intermediate components between the component and the other component. In addition, in the present disclosure, the term "and/or" may include each of one or more items listed or a combination of at least a portion of one or more items.

In the present disclosure, terms such as "first" and "second" are used to distinguish one component from another component, and the components are not limited by the terms. For example, a "first" component may be used to refer to an element of the same or similar form as a "second" component.

Artificial intelligence (AI) refers to the field of studying artificial intelligence or methodologies that can create it, and machine learning refers to the field of researching methodologies that define and solve various issues in the field of artificial intelligence. Machine learning is also defined as an algorithm that improves the performance of a task through continuous experience with that task.

An artificial neural network (ANN) is a model used in machine learning and may refer to an overall model with problem-solving capabilities composed of artificial neurons (nodes) formed by combining synapses. The artificial neural network may be defined by a connection pattern between neurons of different layers, a training process that updates training parameters in the model, and an activation function that generates output values.

The artificial neural network may include an input layer, an output layer, and optionally one or more hidden layers. Each layer may include one or more neurons, and the artificial neural network may include synapses connecting the neurons. In the artificial neural network, each neuron may output a function value of an activation function for input signals received through a synapse, a weight of each layer, and bias.

The training parameters of the model refer to parameters determined through training, and include the weights of synaptic connections and the bias of neurons. In addition, hyperparameters refer to parameters that should be set before training in a machine learning algorithm, and include a learning rate, a number of iterations, a mini-batch size, and an initialization function.

The purpose of training the artificial neural network may be to determine training parameters that minimize a loss function. The loss function may be used as an index to determine the optimal training parameters in the training process of the artificial neural network.

Machine learning may be classified into supervised learning, unsupervised learning, and reinforcement learning according to training methods.

Supervised learning refers to a method of training an artificial neural network with a label for training data, and the label may mean a correct answer (or a result value) that the artificial neural network should infer when the training data is input to the artificial neural network. Unsupervised learning may refer to a method of training an artificial neural network without being given a label for the training data. Reinforcement learning may refer to a training method in which an agent defined in an environment is trained to select an action or a sequence of actions that maximizes cumulative rewards in each state.

Machine learning, which is implemented as a deep neural network (DNN) containing a plurality of hidden layers among artificial neural networks, is also referred to as deep learning, and deep learning is part of machine learning. Hereinafter, the term "machine learning" is used to include deep learning.

The artificial intelligence may be performed by an artificial neural network module.

The present disclosure may be implemented by modifying the deep combiner presented in Non-Patent Document 1. Although a pair of two images captured under the same lighting conditions are input in Non-Patent Document 1, a pair of two images captured under different lighting conditions (flash/no-flash) are input in the present disclosure. A deep combiner presented in Non-Patent Document 1 with an image pair of a flash image and a no-flash image as an input is described.

Pixel color values of a flash image $I^F$ are correlated with pixel color values of a ground truth image I, which is expressed as Equation 1.

$$I_c^F - I_i^F = I_c - I_i + \epsilon_{ci} \qquad \text{(Equation 1)}$$

Here, $I^F_c$ is a color value of pixel c of the flash image $I^F$, $I^F_i$ is a color value of pixel i of the flash image $I^F$, $I_c$ is a color value of pixel c of the ground truth image I, $I_i$ is a color value of pixel i of the ground truth image I, and $\epsilon_{ci}$ is an error term that varies locally according to a difference between $I^F_c - I^F_i$ and $I_c - I_i$.

A camera flash generally increases brightness of an image as a whole, so the pixel color values of the flash image may be brighter than the pixel color values of the ground truth image. However, by modeling the color difference as in Equation 1 instead of the color value itself, overall mismatch between the flash image and the ground truth image does not affect the error term $\epsilon_{ci}$.

Based on the theoretical model presented in Non-Patent Document 1, a mathematical model for estimating the ground truth image by removing noise of the no-flash image from the flash image is shown in Equation 2.

$$\hat{I}_c = \frac{1}{\sum_{i \in \Omega_c} w_{ci}} \left\{ \sum_{i \in \Omega_c} w_{ci} I_i^N + \sum_{i \in \Omega_c} w_{ci}(I_c^F - I_i^F) \right\} \qquad \text{(Equation 2)}$$

Here, $\hat{I}_c$ is an estimated color value of pixel c of the ground truth image, $\Omega_C$ is a set of adjacent pixels of pixel c as an area window (e.g., 15×15) centered on pixel c, $w_{ci}$ is a composite weight of pixel i, which is an adjacent pixel of pixel c included in the area window $\Omega_C$, $I^N_i$ is a color value of pixel i of the no-flash image $I^N$, $I^F_c$ is a color value of pixel c of the flash image $I^F$, and $I^F_i$ is a color value of pixel i of the flash image $I^F$.

In the estimation function of Equation 2, the estimated color value $\hat{I}_c$ of pixel c of the ground truth image may be estimated based on a weighted average value of color values of adjacent pixels of the no-flash image and a weighted average value of differences from adjacent pixels in the flash image.

Therefore, in order to improve accuracy of the estimated color value of pixel c of the ground truth image, it is required to appropriately determine the composite weight $w_{ci}$ for each pixel c, and in Non-Patent Document 1, a convolutional neural network is used to determine the composite weight $w_{ci}$.

When the technology of removing noise from the input of the pair of two images presented in Non-Patent Document 1 is applied directly to the no-flash image and the flash image, artifacts (residual noise or ghosting) may be generated by the inconsistent flash image described above.

In other words, the flash image has hard shadows and specular highlights that are not present in the no-flash image, and as a result, its image structure (e.g., edge) is not the same as that of the ground truth image.

In the present disclosure, a technology is proposed to improve image quality by processing the inconsistent flash image locally into a consistent flash image similar to the ground truth image and then fusing it with the no-flash image.

Figure 2:
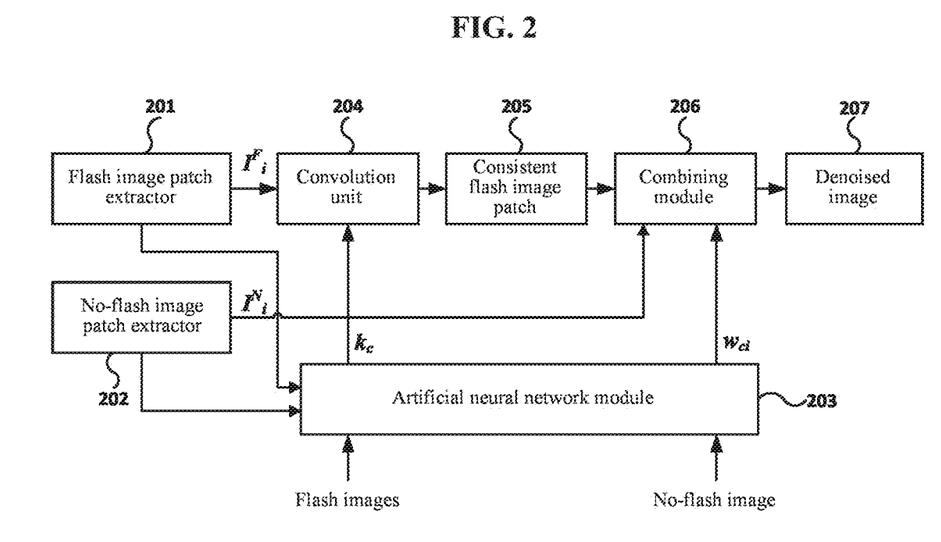
FIG. 2 is a diagram illustrating an apparatus for improving no-flash image quality using a flash image according to an example embodiment of the present disclosure.

FIG. 2 is a diagram illustrating an apparatus for improving no-flash image quality using a flash image according to an example embodiment of the present disclosure.

The present disclosure infers a consistent flash image patch whose image structure matches the ground truth image for a local image patch of the inconsistent flash image. For this purpose, the pixel color value of the flash image is transformed from Equation 1 to Equation 3 below.

$$(k_c * I^F)_c - (k_c * I^F)_i = I_c - I_i + \epsilon_{ci} \quad \text{(Equation 3)}$$

Here, $(k_c * I^F)$ is a result of convolution between a convolutional kernel $k_c$ with a size of K×K and the flash image $I^F$ in pixel c, $(k_c * I^F)_c$ is a color value of pixel c of $(k_c * I^F)$, and $(k_c * I^F)_i$ is a color value of pixel i of $(k_c * I^F)$. $I_c$ is the color value of pixel c of the ground truth image I, $I_i$ is the color value of pixel i of the ground truth image I, and $\epsilon_{ci}$ is the error term that varies locally according to a difference between $(k_c * I^F)_c - (k_c * I^F)_i$ and $I_c - I_i$.

The mathematical model of Equation 2, which estimates the ground truth image based on the pixel color values of the consistent flash image newly defined in Equation 3, may be modified as shown in Equation 4.

$$\hat{I}_c = \frac{1}{\sum_{i \in \Omega_c} w_{ci}} \left[ \sum_{i \in \Omega_c} w_{ci} I_i^N + \sum_{i \in \Omega_c} w_{ci} \{ (k_c * I^F)_c - (k_c * I^F)_i \} \right] \quad \text{(Equation 4)}$$

Here, $\hat{I}_c$ is the estimated color value of pixel c of the ground truth image, $\Omega_C$ is the set of adjacent pixels of pixel c as the area window (e.g., 15×15) centered on pixel c, and $w_{ci}$ is the composite weight of pixel i, which is an adjacent pixel of pixel c included in the area window $\Omega_C$. $k_c * I^F$ is a consistent flash image as a result of convolution between the convolutional kernel $k_c$ and the flash image $I^F$ in pixel c, $(k_c * I^F)_c$ is the color value of pixel c of $(k_c * I^F)$, and $(k_c * I^F)_i$ is the color value of pixel i of $(k_c * I^F)$.

In the estimation function of Equation 4, the estimated color value $\hat{I}_c$ of pixel c of the ground truth image may be estimated based on the weighted average value of the color values of the adjacent pixels of the no-flash image and a weighted average value of differences from adjacent pixels in the consistent flash image.

Here, in order to improve the accuracy of the estimated color value of pixel c of the ground truth image, it is required to appropriately determine the composite weight $w_{ci}$ and the convolutional kernel $k_c$ for producing the consistent flash image per pixel.

Referring to FIG. 2, the apparatus for improving image quality according to an example embodiment of the present disclosure is described.

The apparatus for improving image quality according to the example embodiment of the present disclosure includes a flash image patch extractor 201 configured to extract a local flash image patch $I^F_i$ from a flash image, a no-flash image patch extractor 202 configured to extract a local no-flash image patch $I^N_i$ from a no-flash image, an artificial neural network module 203 configured to learn an image pair of the flash images and the no-flash image and output a convolutional kernel $k_c$ and a composite weight $w_{ci}$ from the flash image patch $I^F_i$ and the no-flash image patch $I^N_i$, a convolution unit 204 configured to generate a consistent flash image patch 205 by convolving the flash image patch $I^F_i$ and the convolutional kernel $k_c$, and a combining module 206 configured to combine the no-flash image patch $I^N_i$ and the consistent flash image patch using the composite weight $w_{ci}$ to produce a denoised image 207.

The flash image patch extractor 201 extracts the local flash image patch from the flash image, and the no-flash image patch extractor 202 extracts the local no-flash image patch from the no-flash image. The size of an image patch may be 64×64, but is not limited thereto.

The artificial neural network module 203 takes an image pair of the flash image patch and the no-flash patch image as input, and may be implemented using a general convolutional neural network that generates the convolutional kernel per-pixel $k_c$ and the composite weight $w_{ci}$. The artificial neural network module 203 may include nine convolution layers, and the last layer may determine the convolutional kernel $k_c$ and the composite weight $w_{ci}$ using a K×K+|$\Omega$C| filter, respectively. The convolutional kernel $k_c$ per pixel may be normalized so that the sum of elements is one (1). Each convolution layer may use a Rectified Linear Activation Function (ReLU). Here, the size of the convolutional kernel (K×K) may be 7×7, and the size of the area window $\Omega_C$ may be 15×15.

In order to determine the composite weight $w_{ci}$ and the convolutional kernel $k_c$ for the image pair of the flash image and the no-flash image, the artificial neural network module 203 may be trained so as to minimize loss (a difference between the estimated color value of the ground truth image and the color value of the ground truth image) with a trainable parameter $\theta$. When the size of the convolutional kernel (K×K) is 7×7 and the size of the area window $\Omega_C$ is 15×15, about 1.84 million parameters may be derived.

An optimal training parameter $\hat{\theta}$ of the artificial neural network module 203 may be defined by Equation 5.

$$\hat{\theta} = \underset{\theta}{\mathrm{argmin}} \frac{1}{3n} \sum_{c=1}^{n} \| \hat{I}_c - I_c \|^2 \quad \text{(Equation 5)}$$

Here, n is the total number of pixels of the ground truth image I.

The convolution unit 204 convolves the flash image patch $I^F_i$ and the convolutional kernel $k_c$ ($k_c * I^F$) to generate the consistent flash image patch 205, and the combining module 206 combines the no-flash image patch $I^N_i$ and the consistent flash image patch $k_c * I^F$ using the composite weight $w_{ci}$ to produce the denoised image 207.

An estimated color value of pixel c of the denoised image output by the combining module 206 is shown in Equation 4.

Figure 3:
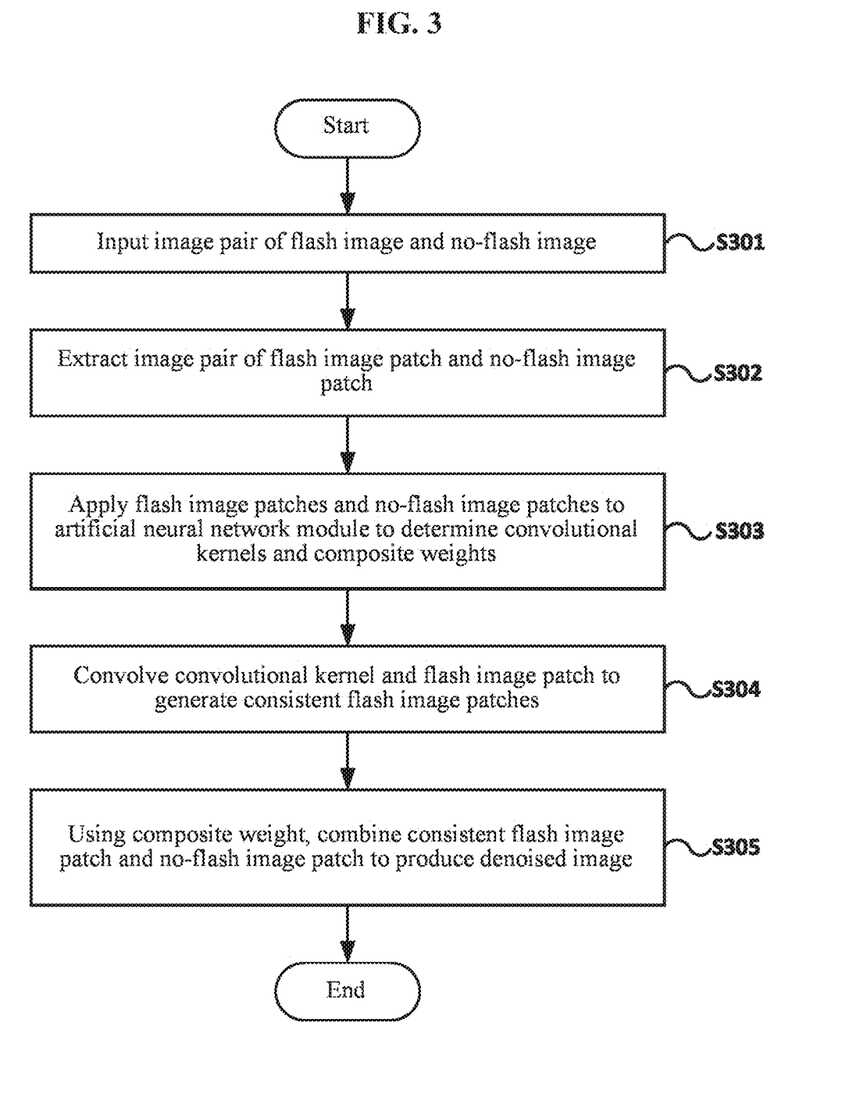
FIG. 3 is a diagram illustrating a method of improving no-flash image quality using a flash image according to an example embodiment of the present disclosure.
Figure 4:
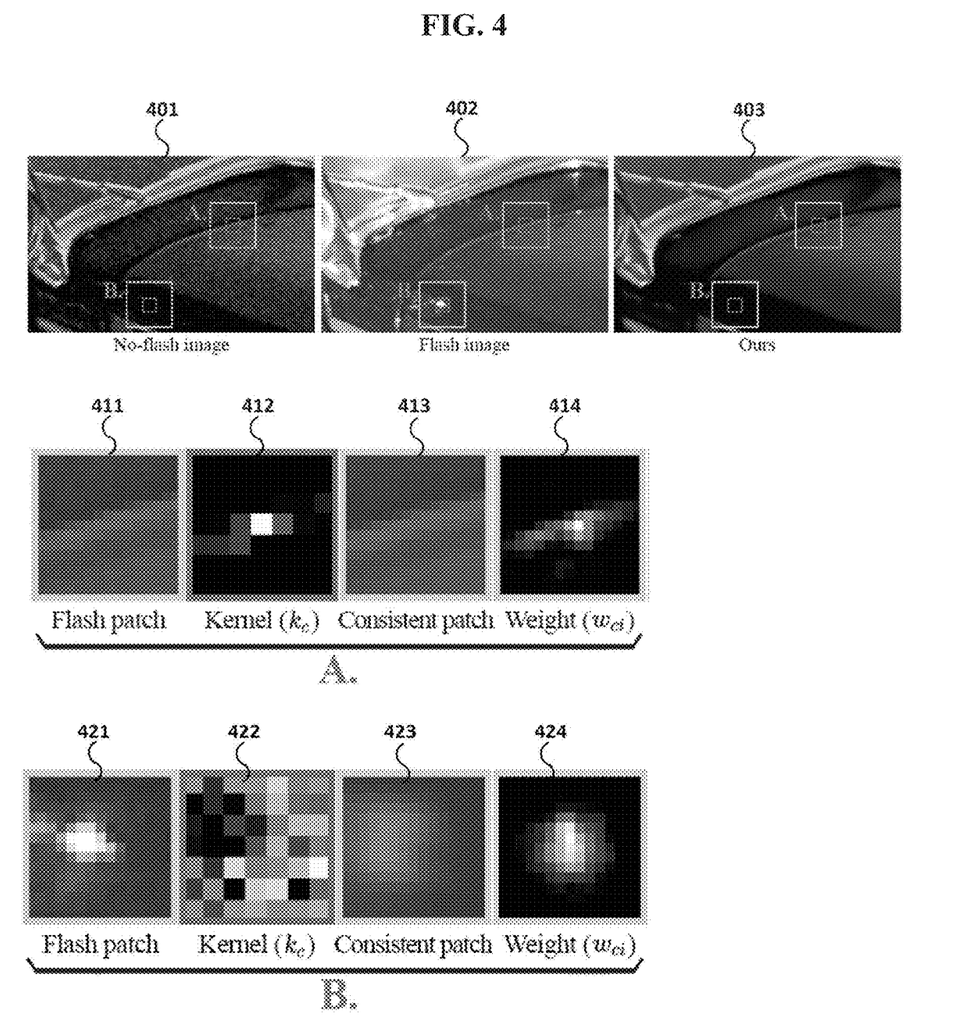
FIG. 4 is an exemplary view of image results obtained in each step of a method of improving image quality of an example embodiment of the present disclosure.

FIG. 3 is a diagram illustrating a method of improving no-flash image quality using a flash image according to an example embodiment of the present disclosure, and FIG. 4 is an exemplary view of image results obtained in each step of a method of improving image quality of an example embodiment of the present disclosure.

Referring to FIGS. 3 and 4, the method of improving image quality according to the example embodiment of the present disclosure is described.

An image patch at position 'A' of FIG. 4 shows an example in which, when the no-flash image and the flash image include the same structure (edge information), the convolutional kernel of the present disclosure maintains the structure (edge) without damaging the structure (edge) by blurring the structure (edge), and an image patch at position 'B' of FIG. 4 shows an example in which the specular highlights are removed by the present disclosure.

An image pair of a no-flash image 401 and a flash image 402 may be input into a system of the present disclosure (S301). The no-flash image and the flash image are preferably aligned.

Then, from the no-flash image 401 and the flash image 402, an image pair of a flash image patch and a no-flash image patch of the same position and size are extracted (S302). FIG. 4 shows an example in which image patches are extracted at two locations ('A' and 'B'), respectively. In the example of FIG. 4, the image patch at position 'A' of the flash image 402 and the image patch at the position 'A' of the no-flash image 401 include similar edge information. The image patch at position 'B' of the flash image 402 has specular highlights that are not present in the image patch at position 'B' of the no-flash image 401.

Then, the image pairs of the flash image patches (411 and 421) and the no-flash image patches are applied to the artificial neural network module to determine convolutional kernels (412 and 422) and composite weights (414 and 424) (S303).

Then, the convolutional kernel and the flash image patch are convolved to generate consistent flash image patches (413 and 423) (S304). Referring to FIG. 4, it can be seen that, compared to the flash image patches 411 and 421, the consistent flash image patches (413 and 423) preserve the same image structure (edges) present in the flash and no-flash for position 'A' and specular highlights that only exist in the flash image have been removed for position 'B'.

Then, using the composite weight, the consistent flash image patch and the no-flash image patch are combined to produce a denoised image 403 (S305). According to the present disclosure, it can be seen that the denoised image has reduced noise compared to the no-flash image 401, the structures (edges) identically present in the flash image and the no-flash image are preserved, and the specular highlights present in the flash image are removed.

Figure 5:
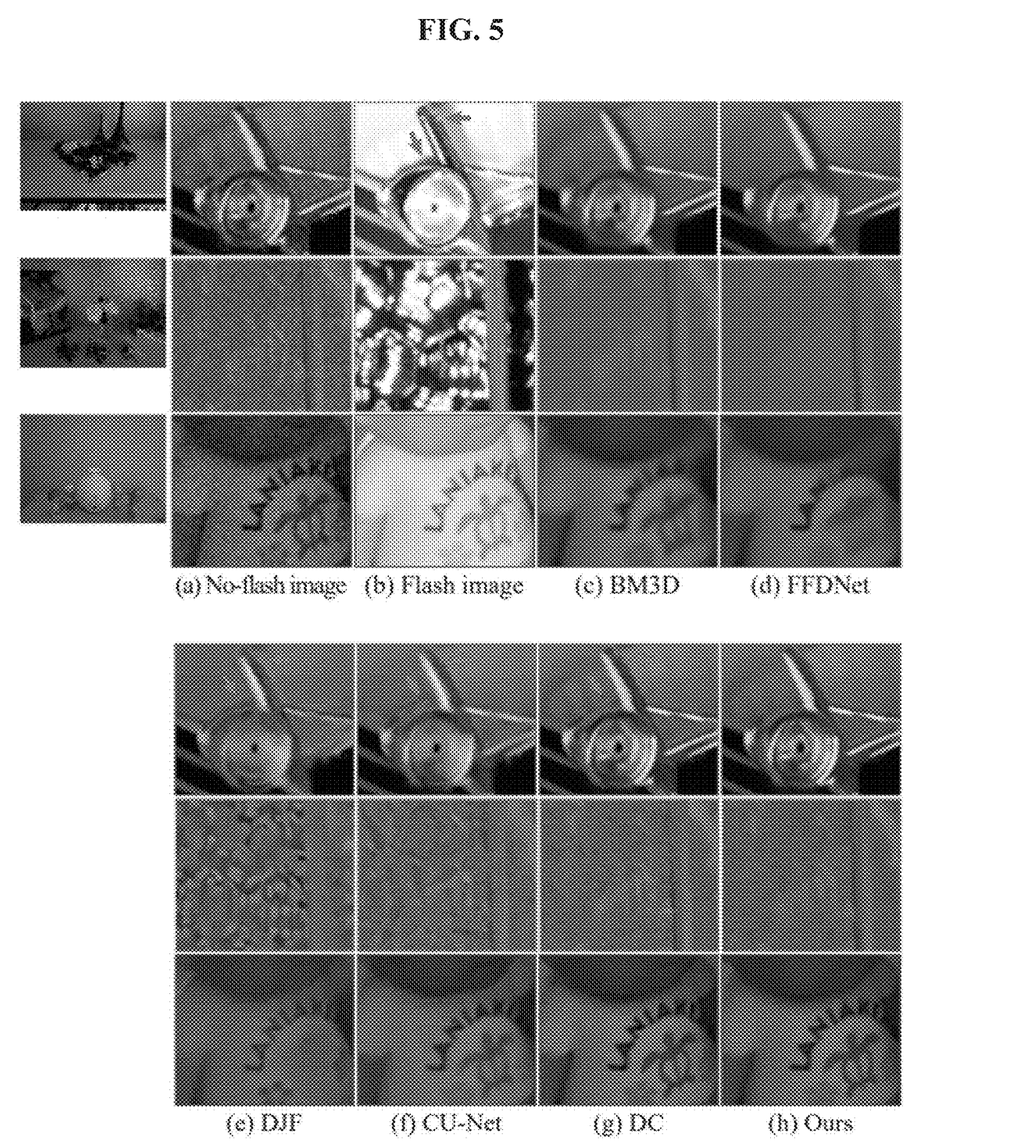
FIG. 5 is a diagram illustrating an effect of an apparatus and method for improving no-flash image quality using a flash image according to an example embodiment of the present disclosure.

FIG. 5 is a diagram illustrating an effect of an apparatus and method for improving no-flash image quality using a flash image according to an example embodiment of the present disclosure.

In FIG. 5, (a) is a no-flash image patch, (b) is a flash image patch, (c) is a result of BM3D [Kostadin Dabov, V. K., Alessandro Foi; and Egiazarian, K. 2007.] (Non-Patent Document 5), (d) is a result of FFDNet [Zhang, K.; Zuo, W.; and Zhang, L. 2018.] (Non-Patent Document 6), (e) is a result of DJF [Li et al. 2016] (Non-Patent Document 2), (f) is a result of CU-Net [Deng and Dragotti 2021] (Non-Patent Document 4), (g) is a result of DC [Back et al. 2020] (Non-Patent Document 1), and (h) is a result of the present disclosure.

Referring to FIG. 5, the apparatus and method for improving image quality according to the example embodiment of the present disclosure more cleanly remove noise from the no-flash image and minimize artifact generation.

All of the methods and processes described above may be implemented as software code modules executed by one or more general-purpose computers or processors and may be fully automated. The code modules may be stored on any type of computer-readable storage medium or other computer storage device. Some or all of the methods may be implemented with special computer hardware.

It should be understood that any routine description, element, or block of the flowchart described herein and/or shown in the accompanying drawing potentially represents a code, module, segment, or section including one or more executable instructions for implementing a particular logical function or element. Alternative examples are included within the scope of the examples described herein, and elements or functions may be deleted or executed in order from those shown or discussed, substantially synchronously or in reverse order, depending on the functionality to be understood herein.

Many variations and modifications may be made to the above-described example embodiments, and any of their elements should be understood as one of other acceptable examples. All such variations and modifications are intended to be included within the scope of this disclosure and protected by the appended claims. The example embodiments according to the present disclosure described above may be implemented in the form of program instructions that can be executed through various computer components and recorded on a non-transitory computer-readable recording medium. A computer-readable recording medium may include program instructions, data files, data structures, and the like, alone or in combination. Program instructions recorded on a non-transitory computer-readable recording medium may be designed and configured specifically for the present disclosure or may be known and available to a person skilled in the computer software art. Examples of non-transitory computer-readable recording media include magnetic media such as hard disks, floppy disks, and magnetic tapes, optical recording media such as CD-ROMs and DVDs, magneto-optical media such as floptical disks, and hardware devices specifically configured to store and execute program instructions such as ROM, RAM, flash memory, and the like. Examples of program instructions include machine code such as those generated by compilers, as well as high-level language code that can be executed by a computer using an interpreter. The hardware device may be configured to operate as one or more software modules to perform processing according to the present disclosure, and vice versa.

Although the present disclosure has been described above, by specific matters such as specific components and limited example embodiments and drawings, they are provided only to facilitate a more general understanding of the present disclosure, and the present disclosure is not limited to the above example embodiments, and a person skilled in the art to which the present disclosure pertains can make various variations and modifications from these descriptions.

Therefore, the idea of the present disclosure should not be limited to the example embodiments described above, and not only the appended claims, but also all modifications equivalent to these claims or their equivalents fall within the scope of the spirit of the present disclosure.

EXPLANATION OF REFERENCE NUMERALS

201; Flash image patch extractor
202; No-flash image patch extractor
203; Artificial neural network module
204; Convolution unit
206; Combining module

What is claimed is:

1. An apparatus for improving no-flash image quality using a flash image, the apparatus comprising:
an artificial neural network module which is trained by receiving an image pair of a flash image and a no-flash image and configured to output a convolutional kernel $k_c$ and a composite weight $w_{ci}$ from a local flash image patch and a no-flash image patch;

a convolution unit configured to convolve the flash image patch and the convolutional kernel to generate a consistent flash image patch; and a combining module configured to combine the no-flash image patch and the consistent flash image patch using the composite weight $w_{ci}$ to produce a denoised image.

2. The apparatus of claim 1, wherein the flash image patch and the no-flash image patch are an aligned image pair.

3. The apparatus of claim 1, wherein the combining module is configured to estimate a color value of pixel c of a ground truth image using an estimation function of Equation 4:

$$\hat{I}_c = \frac{1}{\sum_{i \in \Omega_c} w_{ci}} \left[ \sum_{i \in \Omega_c} w_{ci} I_i^N + \sum_{i \in \Omega_c} w_{ci} \{ (k_c * I^F)_c - (k_c * I^F)_i \} \right] \quad \text{(Equation 4)}$$

where $\hat{I}_c$ is an estimated color value of pixel c of the ground truth image, $\Omega_C$ is a set of adjacent pixels of pixel c as an area window centered on pixel c, $w_{ci}$ is the composite weight, $k_c$ is the convolutional kernel, $k_c * I^F$ is the consistent flash image patch as a result of convolution between the convolution kernel $k_c$ and the flash image patch in pixel c of the convolution unit, $(k_c * I^F)_c$ is a color value of pixel c of $(k_c * I^F)$, and $(k_c * I^F)_i$ is a color value of pixel i of $(k_c * I^F)$.

4. The apparatus of claim 1, wherein the convolutional kernel $k_c$ per pixel is normalized.

5. The apparatus of claim 1, wherein the artificial neural network module is trained by receiving the image pair of the flash image and the no-flash image with a trainable parameter θ so as to minimize loss.

6. The apparatus of claim 5, wherein
an optimal training parameter $\hat{\theta}$ of the artificial neural network module is defined by Equation 5:

$$\hat{\theta} = \underset{\theta}{\operatorname{argmin}} \frac{1}{3n} \sum_{c=1}^{n} \| \hat{I}_c - I_c \|^2 \quad \text{(Equation 5)}$$

where n is the total number of pixels of a ground truth image I, $\hat{I}_c$ is an estimated color value of pixel c of the ground truth image, and $I_c$ is a color value of pixel c of the ground truth image.

7. A method of improving no-flash image quality using a flash image, the method comprising:

applying a local flash image patch and a no-flash image patch to an artificial neural network module trained by receiving an image pair of a flash image and a no-flash image to output a convolutional kernel $k_c$ and a composite weight $w_{ci}$;

convolving the flash image patch and the convolutional kernel to generate a consistent flash image patch by a convolution unit; and combining the no-flash image patch and the consistent flash image patch using the composite weight $w_{ci}$ with an estimation function to produce a denoised image by a combining module.

8. The method of claim 7, wherein the flash image patch and the no-flash image patch are an aligned image pair.

9. The method of claim 7, wherein the estimation function is defined by Equation 4:

$$\hat{I}_c = \frac{1}{\sum_{i \in \Omega_c} w_{ci}} \left[ \sum_{i \in \Omega_c} w_{ci} I_i^N + \sum_{i \in \Omega_c} w_{ci} \{ (k_c * I^F)_c - (k_c * I^F)_i \} \right] \quad \text{(Equation 4)}$$

where $\hat{I}_c$ is an estimated color value of pixel c of the ground truth image, $\Omega_C$ is a set of adjacent pixels of pixel c as an area window centered on pixel c, $w_{ci}$ is the composite weight, $k_c$ is the convolutional kernel, $k_c * I^F$ is the consistent flash image patch as a result of convolution between the convolution kernel $k_c$ and the flash image patch in pixel c of the convolution unit, $(k_c * I^F)_c$ is a color value of pixel c of $(k_c * I^F)$, and $(k_c * I^F)_i$ is a color value of pixel I of $(k_c * I^F)$.

10. The method of claim 7, wherein the convolutional kernel $k_c$ per pixel is normalized.

11. The method of claim 7, wherein the artificial neural network module is trained by receiving the image pair of the flash image and the no-flash image with a trainable parameter θ to minimize loss.

12. The method of claim 11, wherein an optimal training parameter $\hat{\theta}$ of the artificial neural network module is defined by Equation 5:

$$\hat{\theta} = \underset{\theta}{\operatorname{argmin}} \frac{1}{3n} \sum_{c=1}^{n} \| \hat{I}_c - I_c \|^2 \quad \text{(Equation 5)}$$

where n is the total number of pixels of a ground truth image I, $\hat{I}_c$ is an estimated color value of pixel c of the ground truth image, and $I_c$ is a color value of pixel c of the ground truth image.

* * * * *